United States Patent
Wood et al.

(10) Patent No.: US 9,054,777 B2
(45) Date of Patent: Jun. 9, 2015

(54) IMPROVEMENTS RELATING TO SIGNAL PROCESSING

(75) Inventors: John Michael Wood, Chelmsford (GB); Christopher Ralph Pescod, Chelmsford (GB)

(73) Assignee: BAE SYSTEMS PLC, London (GB)

( * ) Notice: Subject to any disclaimer, the term of this patent is extended or adjusted under 35 U.S.C. 154(b) by 639 days.

(21) Appl. No.: 13/262,790

(22) PCT Filed: Apr. 1, 2010

(86) PCT No.: PCT/GB2010/050580
§ 371 (c)(1),
(2), (4) Date: Oct. 3, 2011

(87) PCT Pub. No.: WO2010/112939
PCT Pub. Date: Oct. 7, 2010

(65) Prior Publication Data
US 2012/0027401 A1  Feb. 2, 2012

(30) Foreign Application Priority Data
Apr. 3, 2009 (GB) .................................. 0905820.7

(51) Int. Cl.
*H04B 10/08* (2006.01)
*H04B 1/28* (2006.01)
*H04B 10/2575* (2013.01)

(52) U.S. Cl.
CPC .............. *H04B 1/28* (2013.01); *H04B 10/2575* (2013.01); *H04B 2210/006* (2013.01)

(58) Field of Classification Search
CPC ...................... H04B 2210/006; H04B 10/2575
USPC ................................................. 398/115–117
See application file for complete search history.

(56) References Cited

U.S. PATENT DOCUMENTS

| 4,679,168 A | 7/1987 | Conway et al. |
| 5,555,119 A | 9/1996 | Lewis |

(Continued)

FOREIGN PATENT DOCUMENTS

| EP | 0 856 952 A2 | 8/1998 |
| GB | 2 259 595 A | 3/1993 |

(Continued)

OTHER PUBLICATIONS

International Search Report (PCT/ISA/210) issued on Jul. 16, 2010, by European Patent Office as the International Searching Authority for International Application No. PCT/GB2010/050580.

(Continued)

*Primary Examiner* — David Payne
*Assistant Examiner* — Tanya Motsinger
(74) *Attorney, Agent, or Firm* — Maine Cernota & Rardin

(57) ABSTRACT

A method of sampling a radio frequency signal comprises: receiving the radio frequency signal; modulating an optical signal with the radio frequency signal and an oscillator signal to generate a modulated signal; applying a filter to the modulated signal to generate an intermediate frequency signal, the filter having an intermediate pass band and an intermediate roll-off, the intermediate pass band and the intermediate roll-off in combination defining a intermediate frequency band having a first bandwidth; and sampling the intermediate frequency signal at a sampling frequency using a number of optically interleaved analog-to-digital converters. The oscillator signal and the sampling frequency in combination are arranged such that the intermediate frequency band is defined between consecutive multiples of half of the sampling frequency.
Corresponding apparatus for sampling a radio frequency signal is also disclosed. Apparatus and methods for synthesizing a radio frequency signal, using similar techniques to the above, are also disclosed.

26 Claims, 5 Drawing Sheets

(56) References Cited

U.S. PATENT DOCUMENTS

| | | | |
|---|---|---|---|
| 6,069,923 | A | 5/2000 | Östman et al. |
| 6,118,396 | A * | 9/2000 | Song ............................ 341/137 |
| 6,219,172 | B1 | 4/2001 | Yariv |
| 6,459,522 | B2 * | 10/2002 | Yariv ............................ 359/264 |
| 6,661,361 | B1 * | 12/2003 | Lewis et al. .................... 341/137 |
| 6,700,517 | B1 * | 3/2004 | Kellar ............................ 341/137 |
| 7,627,253 | B1 * | 12/2009 | Ng .................................. 398/161 |
| 7,868,799 | B1 * | 1/2011 | Price et al. ..................... 341/137 |
| 7,876,246 | B1 * | 1/2011 | Price et al. ..................... 341/118 |
| 7,956,788 | B2 * | 6/2011 | Lee et al. ....................... 341/155 |
| 8,260,145 | B2 * | 9/2012 | Gupta et al. .................... 398/115 |
| 8,442,402 | B1 * | 5/2013 | Zanoni et al. .................. 398/115 |
| 8,456,336 | B1 * | 6/2013 | Zanoni et al. .................. 341/137 |
| 8,548,331 | B1 * | 10/2013 | Zanoni et al. .................. 398/115 |
| 8,599,051 | B2 * | 12/2013 | Yoshida et al. ................ 341/118 |
| 8,743,914 | B1 * | 6/2014 | Jensen ............................ 370/535 |
| 8,837,956 | B1 * | 9/2014 | Zanoni et al. .................. 398/202 |
| 2002/0094794 | A1 | 7/2002 | Manku et al. |
| 2002/0163454 | A1 * | 11/2002 | Yap et al. ....................... 341/137 |
| 2004/0169773 | A1 * | 9/2004 | Johnson ......................... 348/731 |
| 2004/0190911 | A1 * | 9/2004 | Franco et al. .................. 398/189 |
| 2006/0022853 | A1 * | 2/2006 | Nussbaum ....................... 341/61 |
| 2006/0045535 | A1 * | 3/2006 | Sasai ............................... 398/152 |
| 2006/0120730 | A1 * | 6/2006 | Drentea .......................... 398/201 |
| 2008/0212968 | A1 * | 9/2008 | Lindop et al. .................... 398/91 |
| 2008/0253489 | A1 * | 10/2008 | Huang ............................ 375/346 |
| 2009/0027250 | A1 * | 1/2009 | Nara ............................... 341/155 |
| 2009/0051582 | A1 | 2/2009 | Williams et al. |
| 2010/0028012 | A1 * | 2/2010 | Ng .................................. 398/116 |
| 2010/0087227 | A1 * | 4/2010 | Francos et al. .............. 455/562.1 |
| 2013/0188962 | A1 * | 7/2013 | Middleton et al. ............ 398/116 |

FOREIGN PATENT DOCUMENTS

| | | |
|---|---|---|
| WO | WO 93/13427 A1 | 7/1993 |
| WO | WO 99/26363 A1 | 5/1999 |
| WO | WO 00/75721 A1 | 12/2000 |
| WO | WO 2006/128250 A1 | 12/2006 |
| WO | WO 2008/121180 A2 | 10/2008 |

OTHER PUBLICATIONS

Written Opinion (PCT/ISA/237) issued on Jul. 16, 2010, by European Patent Office as the International Searching Authority for International Application No. PCT/GB2010/050580.

United Kingdom Search Report for GB 0905820.7 dated Jun. 27, 2009.

G. Gopalakrishnan et al., "Microwave-Optical Mixing in $LiNbO_3$ Modulators", IEEE Transaction on Microwave Theory and Techniques, Dec. 1993, pp. 2383-2391, vol. 41, No. 12.

C.K. Sun et al., "Efficient Microwave Frequency Conversion Using Photonic Link Signal Mixing", IEEE Photonics Technology Letters, Jan. 1996, pp. 154-156, vol. 8, No. 1.

* cited by examiner

IMPROVEMENTS RELATING TO SIGNAL PROCESSING

This invention concerns improvements relating to processing a radio frequency signal. The invention is particularly applicable to the problem of unambiguous down-conversion of received signals, and to the problem of synthesising a radio frequency signal. It is expected that the invention will find application in interfacing to apparatus for digitally processing radio frequency signals.

There exists a need in many applications to sample a large section of the radio frequency spectrum, in order to facilitate processing of a radio frequency signal. The radio frequency spectrum covers the frequency range between around 0.5 GHz, and around 30 GHz. However, commonly available, conventional receivers operate across a frequency band of only a few MHz. Conventional receivers can be made to function up to a bandwidth of around 300 MHz, although their frequency response may not be sufficiently flat for some applications as the bandwidth becomes larger. In order to sample across a wider range of the entire radio frequency spectrum, therefore, it has been suggested to combine a number of such conventional receivers. However remains difficult to sample across a large part of the radio frequency spectrum because it is difficult to combine the necessary number of receivers. Similar problems exist for the problem of synthesising a radio frequency signal from a digitally generated signal.

The present invention arose as a result of consideration of the problem of how to unambiguously sample across a wide range of the radio frequency spectrum, and, correspondingly, how to synthesise a signal across a wide range of the radio frequency spectrum.

In accordance with a first aspect of the present invention, there is provided a method of sampling a radio frequency signal comprising the steps of: receiving the radio frequency signal; modulating an optical signal with the radio frequency signal and an oscillator signal to generate a modulated signal; applying a filter to the modulated signal to generate an intermediate frequency signal, the filter having an intermediate pass band and an intermediate roll-off, the intermediate pass band and the intermediate roll-off in combination defining an intermediate frequency band having a first bandwidth; and sampling the intermediate frequency signal at a sampling frequency; the oscillator signal and the sampling frequency in combination being arranged such that the intermediate frequency band is defined between consecutive multiples of half of the sampling frequency. The step of sampling the intermediate frequency signal may be achieved using a number of optically interleaved analogue-to-digital converters.

By combining an inherently wideband optical frequency translation process with the high sampling frequency obtainable using a number of optically interleaved analogue-to-digital converters, it is possible to sample across a large range of the radio frequency spectrum whilst avoiding any ambiguity at Nyquist boundaries by ensuring that there is available bandwidth for filter roll-off, and maintaining a manageable filtering requirement.

The frequency of the oscillator signal may be variable such that the intermediate frequency band can be defined between consecutive multiples of half of the sampling frequency independently of the frequency of the radio-frequency signal. The frequency of the oscillator signal may be tuneable. Alternatively, the frequency of the oscillator signal may be switchable between a number of fixed frequency oscillator signals. Use of an oscillator signal that is switchable between a number of fixed frequencies avoids delays in tuning the oscillator frequency.

The step of receiving the radio frequency signal may comprise applying a band-definition filter to the radio frequency signal, the band-definition filter having a band-definition pass band, and a band-definition roll-off, the band-definition pass band and the band definition roll-off in combination defining a second bandwidth generally equal to the first bandwidth. It is particularly convenient for the second bandwidth to be generally equal to the first bandwidth where the range of frequency across which operation is desired is large. The band-definition pass band may be switchable between a number of fixed-frequency bands The band definition filter may be a switchable filter bank. Use of a filter bank, where the filter pass band is switchable between a number of fixed frequencies, is possible because the high sampling frequency means that only a small number of filters are necessary. For example, if the sampling frequency is 8 giga-samples per second, the unambiguous bandwidth is 4 GHz, which, allowing for 1 GHz filter roll-off, allows the radio frequency spectrum between 4 GHz and 18 GHz to be sampled in seven intervals of 2 GHz bandwidth. In that case, only seven filters are needed. This represents a particularly convenient way of sampling a wide bandwidth, since it avoids the need for a complex tuneable filter, and therefore avoids delays in tuning the filter pass band. The use of the filter bank is particularly convenient in combination with a switchable oscillator frequency.

The intermediate frequency signal may be defined between zero frequency and half of the sampling frequency.

The sampling frequency may be greater than 1 giga samples per second, but is more preferably greater than 5 giga samples per second, and is yet more preferably greater than 8 giga samples per second.

The step of optically interleaving a number of analogue to digital converters may comprise: modulating an optical signal with the intermediate frequency signal to generate an optically-carried intermediate frequency signal; passing the pulsed signal through an optical commutator switch, thereby generating a number of interleaved pulses; detecting the interleaved pulses at a number of photodetectors, each of the photodetectors being associated with one of the analogue to digital converters. It will be understood that the term 'optical commutator switch' is used herein to refer to a tree of optical switches, or an optical switch matrix arranged to function as an optical demultiplexer.

In accordance with a second aspect of the invention, there is provided sampling apparatus for sampling a radio frequency signal, the apparatus comprising: a receiver to receive the radio frequency signal; a modulator to modulate an optical signal with the radio frequency signal and an oscillator signal to select a modulated signal; a filter operable to filter the modulated signal to generate an intermediate frequency signal, the filter having an intermediate pass band and an intermediate roll-off, the intermediate pass band and the intermediate roll-off in combination defining a intermediate frequency band having a first bandwidth; and a sampler to sample the intermediate frequency signal at a sampling frequency; the oscillator signal and the sampling frequency in combination being arranged such that the intermediate frequency band is defined between consecutive multiples of half of the sampling frequency.

In accordance with a third aspect of the present invention, there is provided a method of synthesising a radio frequency signal comprising the steps of: generating an intermediate frequency signal from a digital signal using a number of optically interleaved digital to analogue converters; generating a modulated signal by modulating an optical signal with the intermediate frequency signal and an oscillator signal; and applying a first filter to the modulated signal to select the radio-frequency signal, the first filter having a first pass band and a first roll-off, and the first pass band and the first roll-off in combination defining a first bandwidth, wherein the effective sample rate of the digital signal is selected such that the first bandwidth is less than, or equal to the bandwidth defined between consecutive multiples of half the effective sampling rate.

In accordance with a fourth aspect of the present invention, there is provided synthesising apparatus for synthesising a radio frequency signal, the apparatus comprising: means to generate an intermediate frequency signal from a digital signal using a number of optically interleaved digital to analogue converters; a modulator to modulate an optical signal with the intermediate frequency signal and an oscillator signal; and a first filter operable to select the radio-frequency signal from the modulated signal, the first filter having a first pass band and a first roll-off, and the first pass band and the first roll-off in combination defining a first bandwidth, wherein the effective sample rate of the digital signal is selected such that the first bandwidth is less than, or equal to the bandwidth defined between consecutive multiples of half the effective sampling rate.

In accordance with a fifth aspect of the present invention, there is provided sampling apparatus as defined above, synthesising apparatus as defined above, and a digital radio frequency memory; the sampling apparatus, synthesising apparatus and digital radio frequency memory being operable in combination to receive a radio frequency signal, digitally process the radio frequency signal, and to retransmit the processed radio frequency signal.

Preferred embodiments of the invention will now be described by way of example only, with reference to the accompanying Figures, in which.

Figure 2:
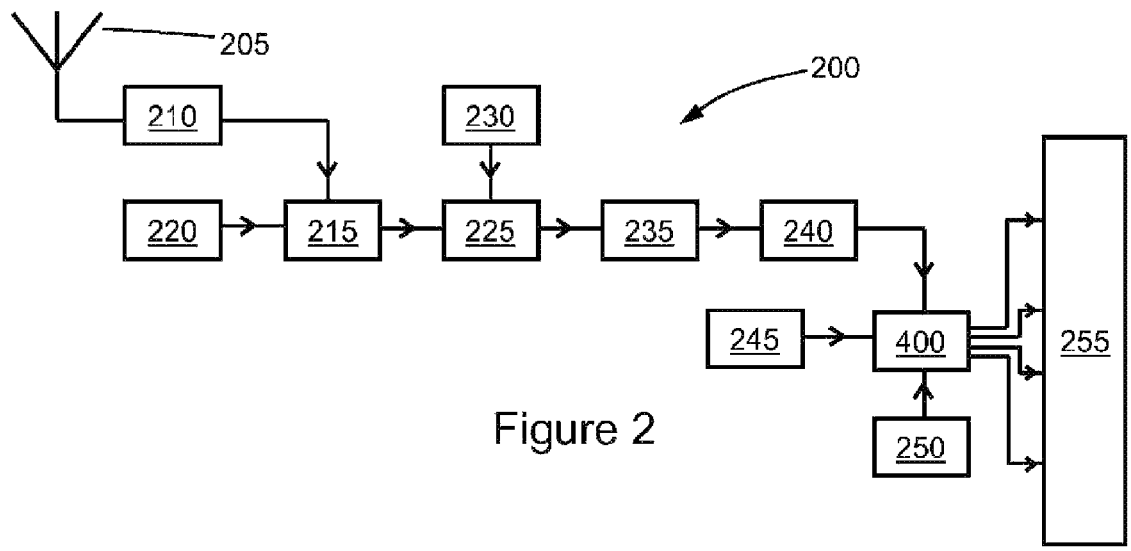
FIG. 2 is a schematic diagram of a frequency down-converter operable to perform the steps illustrated in FIGS. 1a to 1c.
Figure 3:
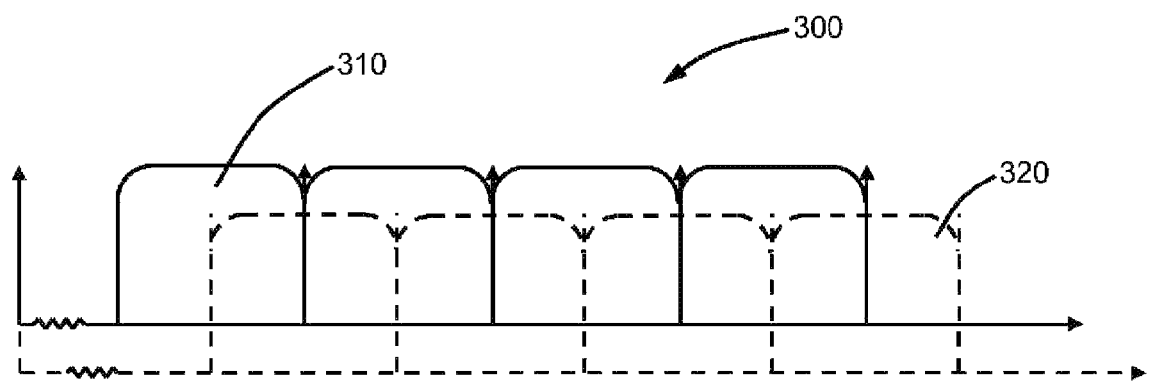
Figure 4:
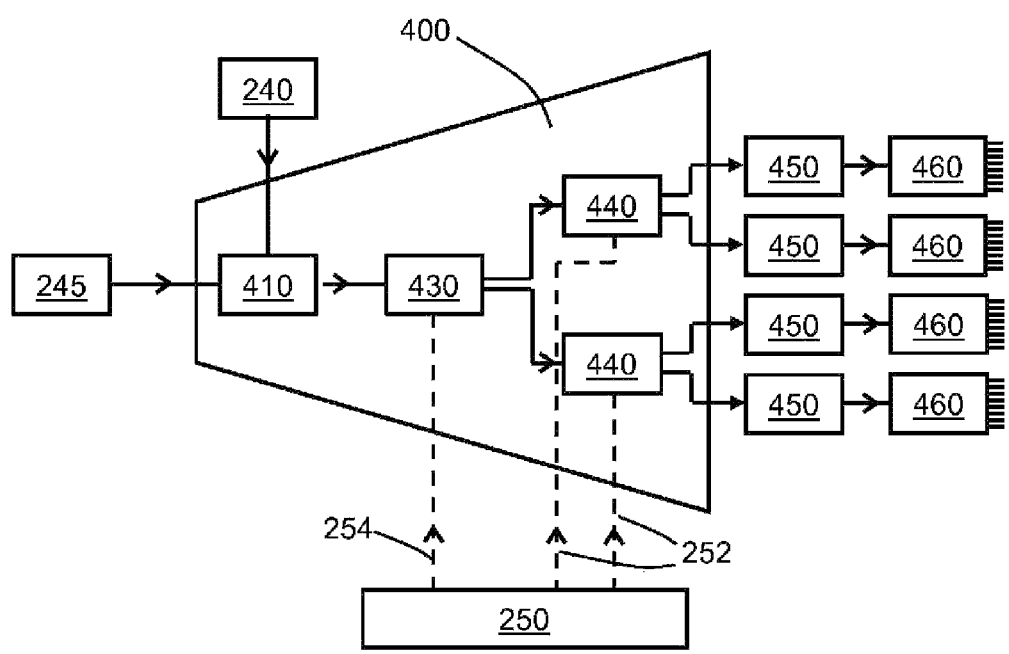
Figure 5A:
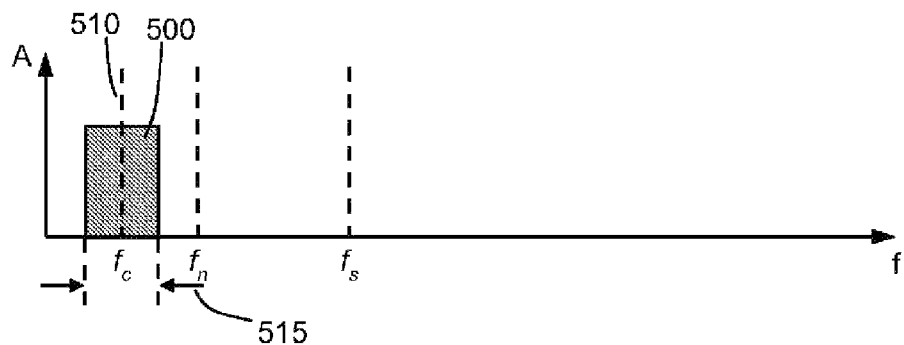
Figure 5B:
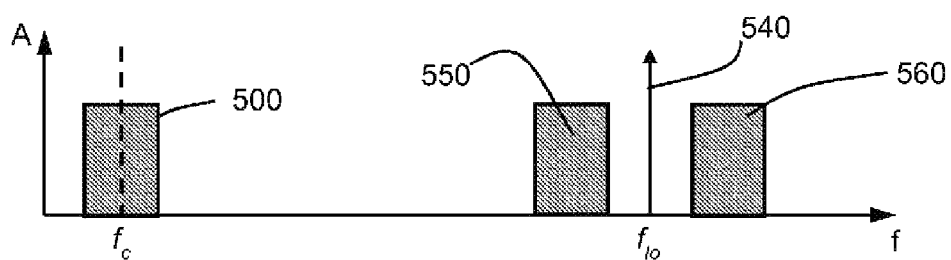
Figure 5C:
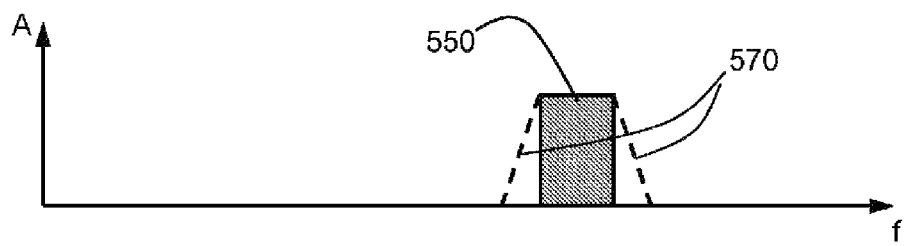
Figure 6:
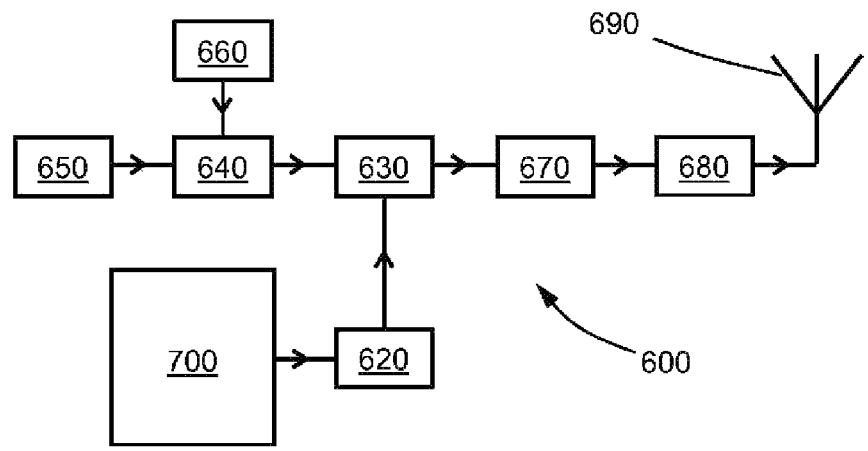
Figure 7:
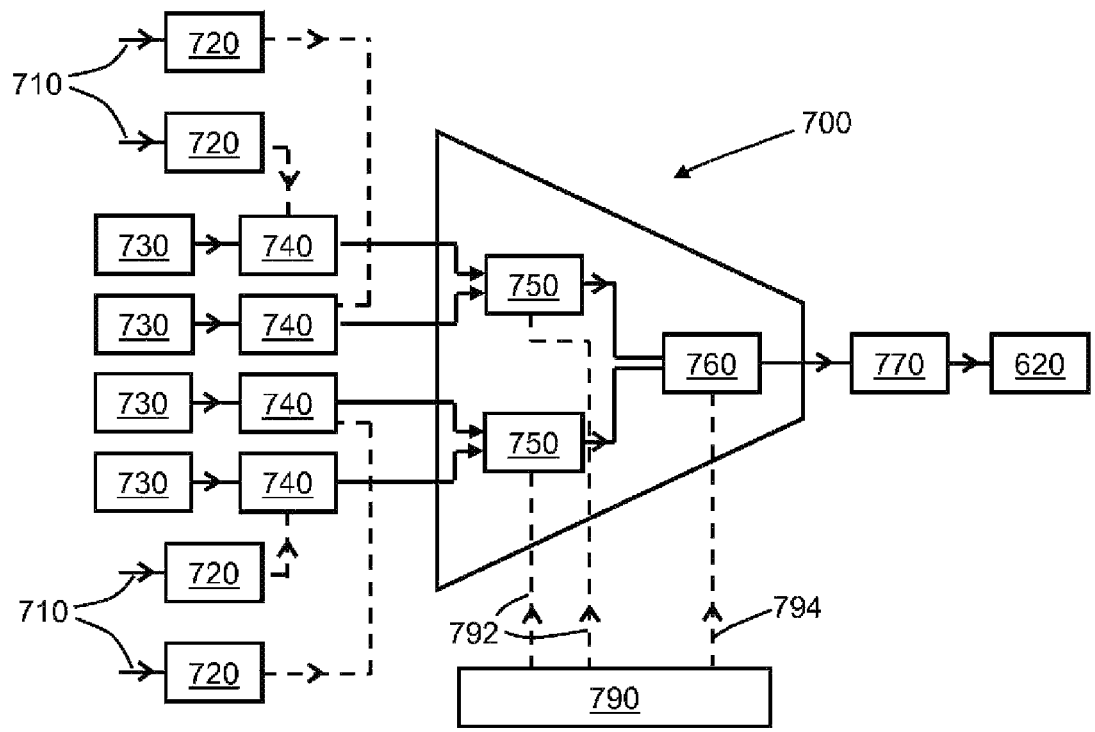

FIG. 3 schematically illustrates the response of a switched filter bank forming a part of the first embodiment illustrated in FIG. 2;

FIG. 4 is a schematic diagram to illustrate in further detail a component of the first embodiment illustrated in FIG. 2;

FIGS. 5a to 5c illustrate the steps by which a radio frequency signal can be synthesised in accordance with a second embodiment of the invention;

FIG. 6 is a schematic diagram of synthesising apparatus operable to perform the steps illustrated in FIGS. 5a to 5c; and FIG. 7 is a schematic diagram to illustrate in further detail a component of the second embodiment illustrate in FIG. 6.

Embodiments of the present invention, as described below, provide methods and apparatuses for the sampling and synthesising of a radio frequency signal. It is envisaged that such methods and apparatuses will find application in interfacing to a digital radio frequency memory, or to digital oscilloscopes.

Figure 1A:
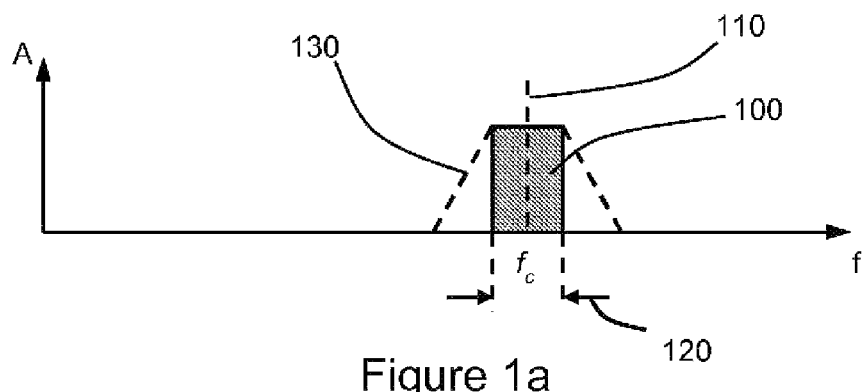
FIGS. 1a to 1c illustrate the steps by which a received signal is processed in accordance with a first embodiment of the invention.
Figure 1B:
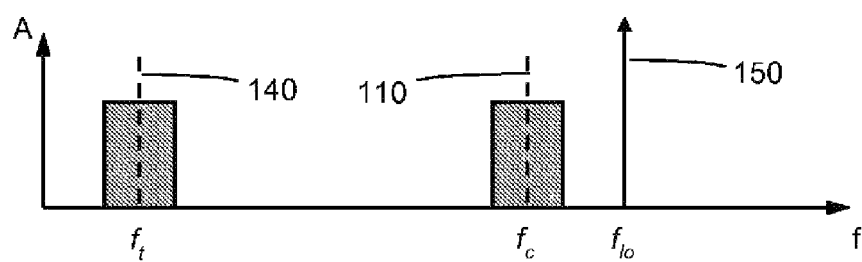
Figure 1C:
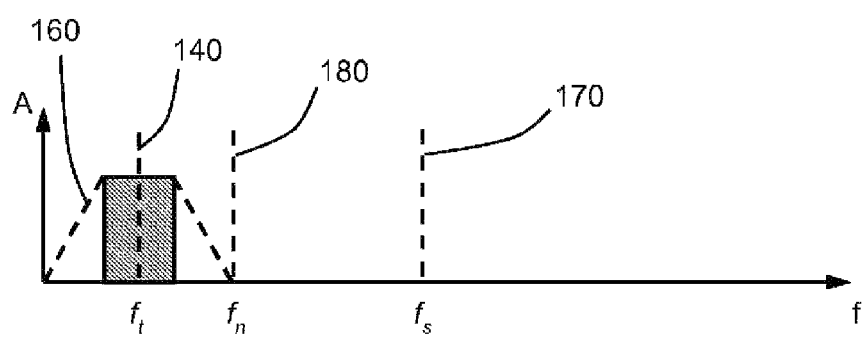

FIGS. 1a to 1c schematically illustrate the steps performed in a sampling method in accordance with an embodiment of the present invention. Each of FIGS. 1a to 1c is a plot of the amplitude of a signal in the frequency domain. In FIG. 1a, a received signal, as defined by a band-defining filter, is illustrated. The received signal is illustrated by shaded area 100, although it will be understood that any signal within the shaded area could also be processed by the method outlined with reference to FIGS. 1a to 1c. The band-defining filter has centre frequency $f_c$ illustrated by the dashed line indicated by reference numeral 110, a pass-band illustrated by arrow 120, and a roll-off region illustrated by the dashed line indicated by reference numeral 130. This signal is translated in frequency using an optical mixer: the filtered received signal is used to modulate an optical signal, and a local oscillator of frequency $f_{lo}$, is then used to further modulate the optical signal. The resulting optical signal is converted back to an electrical signal having spectral replicas of the signal at $f_{lo} \pm f_c$. FIG. 1b illustrates this process, showing the original centre frequency at 110, the local oscillator signal $f_{lo}$ at 150, and the lower frequency spectral replica at centre frequency $f_t$ as is indicated by dashed line 140. The higher frequency spectral replica is not illustrated. FIG. 1c illustrates the signal after the application of a final band pass filter, which has a pass band centred on $f_t$ of equal width to that illustrated in FIG. 1a, and a roll-off illustrated by the dashed lines 160.

The signal remaining after application of the band-pass filter is indicated by the shaded region in FIG. 1c. This remaining signal is suitable to be sampled at a sampling frequency $f_s$, as indicated by dashed line 170. The sampling frequency is sufficiently high that the corresponding Nyquist frequency $f_n$, illustrated schematically in FIG. 1c by the dashed line 180 and equal to half of the sampling frequency $f_s$, is above the upper end of the filter roll-off illustrated by dashed line 160. Thus, the entire bandwidth of the signal to be sampled, along with sufficient bandwidth to allow for the roll-off properties of the filter used, is contained within the baseband defined by the sampling frequency. In the embodiments described below, the signal bandwidth is defined to be 2 GHz by selection of a suitable band defining filter; 1 GHz filter roll-off is provided for by selection of an 8 giga-samples per second (GS/s) sampling rate.

Sampling apparatus 200 in accordance with a first embodiment of the invention is illustrated in FIG. 2. Sampling apparatus 200 processes an input radio frequency signal in two stages. Firstly, the signal is optically frequency translated to a baseband frequency, defined by the sampling rate at which the sampling apparatus functions. Secondly, the frequency translated signal is sampled by a number of analogue-to-digital converters that are interleaved using an optical commutator switch.

The input radio frequency signal is received by antenna 205, and processed by the sampling apparatus to produce a digital signal to be passed to the digital radio frequency memory 255. Apparatus 200 is designed to function over the frequency band between 4 GHz and 18 GHz, and to process radio frequency signals of instantaneous bandwidth of order 2 GHz. The received signal is passed to band defining filter 210. The filter 210 defines the 2 GHz band to be sampled by the sampling apparatus. In the present embodiment, the passband of the filter is 2 GHz wide, with 40 dB rejection at frequencies 1 GHz above and below the pass band.

In the present embodiment, filter 210 is provided by a switchable filter bank. The centre-frequency of the filter can be switched in 1 GHz steps from 5 GHz to 19 GHz, allowing for overlap between consecutive pass-bands. This is illustrated schematically in FIG. 3, which shows a plot 300 of frequency response of the input filter bank versus frequency. The filters in the filter bank are shown in two overlapping groups: those in solid line labelled with reference numeral 310, and those in dashed line labelled with reference numeral 320. It will be appreciated that not all of the filters in the filter bank 210 are illustrated in FIG. 3 for reasons of clarity. However, it will be noted that, because of the overlap between consecutive pass bands, it is ensured that any received signal of bandwidth up to 1 GHz can be processed in its entirety.

The filtered received signal is provided as an input to modulator 215, and is used to modulate an optical signal provided by laser diode 220. Modulator 215 is a commercially-available Mach-Zehnder modulator operable over the frequency range between 0.5 GHz and 18 GHz. The resulting modulated optical signal is then frequency translated. A second modulator 225 receives as input the modulated optical signal, and a local oscillator signal from local oscillator source 230. Modulator 225 is a further commercially-available Mach-Zehnder modulator, and is operable over the frequency range between 5 GHz and 19 GHz. The local oscillator source 230 can be switched to select a frequency in 1 GHz steps between 5 GHz to 19 GHz, in dependence on the frequency band defined by the band-defining filter 210, so as to translate the frequency of the signal to a baseband defined by the frequency at which the signal is to be sampled. The sampling apparatus operates at a sampling frequency of 8 gigasamples per second. This sampling frequency corresponds to an unambiguous base band up to frequencies of half the sample rate, which, in the present embodiment, corresponds to an upper limit of 4 GHz for the base band. Modulation of the modulated optical signal by the local oscillator signal generates spectral replicas of the modulated signal at sum and difference frequencies, and at the original frequency of the modulated optical signal. The frequency of the local oscillator signal is selected such that the difference frequency lies in the band between 1 GHz and 3 GHz.

The output from the second modulator 225 is passed to photodiode 235 and converted to an electrical signal. In the present embodiment, photodiode 235 is a high power handling photodiode sensitive to signals of frequency in the range between 0 and 10 GHZ. The electrical output from the photo diode 235 is then altered by band pass filter 240 to remove unwanted spectral replicas from the signal, such that sampling is performed on the baseband replica of the signal only. Filter 240 has a pass-band between 1 GHZ and 3 GHZ, With 40 dB attenuation at 100 MHZ and at 4 GHZ. Thus the optical frequency translation of the input radio frequency signal to a baseband signal suitable for sampling is accomplished.

The second stage of the sampling process is the sampling of the frequency translated signal, performed by apparatus 400. Apparatus 400 receives as input the frequency translated signal, an optical carrier signal provided by laser diode 245, and a clock signal provided by clock 250. Apparatus 300 outputs a number of interleaved samples that form an input to digital radio frequency memory 255.

Apparatus 400 is shown in more detail in FIG. 4. The received frequency translated signal is provided to modulator 410, and is used to intensity modulate the output of the laser diode 245. The signal is then dealt out to four photodiodes 450 by a two rank optical commutator switch. The two rank optical commutator switch comprises first rank switch 430, which receives a clock signal on line 254 at a frequency of 4 GHz to provide a pulsed signal to each of two second rank switches 440. Second rank switches 440 each receive a clock signal at a frequency of 2 GHz. Each second rank switch 440 provides a pulsed signal to one of four photodiodes 450. Each of components 410, 430, and 440 are Mach-Zehnder modulators configured to be either single (component 410) or dual (components 430, 440) output, and to be driven either by a radio frequency signal to modulate an optical signal, or by a clock signal so as to act as a switch. Such components are commercially available.

Photodiodes 240 are responsive over a frequency range between 0 GHz and 6 GHz, and provide an electrical signal to an associated analogue to digital converter 460. In the present embodiment, the analogue-to-digital converters have 8 bit resolution and provide a 2 GS/s sampling rate. By interleaving four such analogue-to-digital converters using the two rank optical commutator switch as described above, a combined sampling rate of 8 GS/s is achieved. The output from the analogue to digital converters is then passed to the inputs of the digital radio frequency memory, where processing of the signal can be performed.

It will be noted from the above that the entire band from 4 GHz to 18 GHz can be unambiguously sampled, in separate 2 GHz sub-divisions. Processing of the entire band would be undesirable, given the necessary 36 GS/s sampling frequency, and the cost, size, weight and power requirements. The signal processing requirements for the digital radio frequency memory would also be prohibitive. The sampling technique applied avoids problems associated with spectral folding at Nyquist boundaries by applying a wide-band optical frequency translation technique, and uses a number of interleaved analogue-to-digital converters in order to achieve a high sampling rate, such that space can be provided for filter roll-off so as to avoid cumbersome filtering requirements.

The above-described embodiment of the invention is operable to sample signals in the frequency range between 4 GHz and 18 GHz. It is envisaged that it may be desirable to extend this range to lower frequencies in some applications. Signals of a frequency up to 3 GHz can be unambiguously sampled by switching out the frequency translation stage. Between 3 Ghz and 4 GHz, however, this is not possible because of the need to provide for a 1 GHz filter roll-off. A single stage frequency translation, as described above, is also not possible, because the lower frequency spectral replica would overlap with the original received signal, making the filtering requirement impossible.

This problem can be avoided by using a two-stage frequency translation process, allowing the originally received signal to be filtered out in an intermediate filtering stage. Thus, for example, in order to sample a received signal in a frequency band between 3 GHz and 5 GHz, similar apparatus to that described above could be used, with the addition of a further frequency translation stage: firstly, an 8 GHz local oscillator signal is used to generate spectral replicas centred at 4 GHz and 12 GHz, and band pass filter having a 2 GHz wide pass-band, and 1 GHz roll-off, is used to select the higher-frequency spectral replica. Secondly, a 14 GHz local oscillator signal is applied, generating the desired spectral replica centred at 2 GHz, and a higher frequency spectral replica centred at 26 GHz. Suitable filtering is then applied, as above, before sampling the lower frequency as described above. The skilled reader will readily appreciate that other signals at other frequencies could readily be sampled using this technique.

Having described an embodiment of the invention for sampling a signal in the frequency band between 4 GHz and 18 GHz, an embodiment of the invention for synthesising a signal in the band between 4 GHz and 18 GHz will now be described. As in the case of the sampling method of the present invention described above, signals are synthesised in two stages. In the first stage, an output from a digital radio frequency memory is converted to a base band analogue signal by a number of interleaved digital-to-analogue converters. In the second stage, the baseband signal is optically frequency translated to the desired output frequency.

FIGS. 5a to 5c illustrate in broad terms the steps performed in a synthesising method in accordance with a second embodiment of the present invention. Similarly to FIGS. 1a to 1c, FIGS. 5a to 5c are plots of the amplitude of the signal in the frequency domain at three different stages in the synthesis of a radio frequency signal. FIG. 5a illustrates the output 500 from interleaved digital-to-analogue converters, generated in the first stage of the method. The output is centred on frequency $f_c$, as is indicated by the dashed line indicated by reference numeral 510, and has the band width indicated by arrow 515. The signal is formed from samples generated at an effective sample rate of $f_s$, in the present embodiment 8 GS/s, and having a Nyquist frequency $f_n$ equal to half of $f_s$. It is ensured that the sample rate is sufficiently large to enable the entire bandwidth 515 to be contained in the unambiguous baseband having the upper frequency limit of $f_n$, and that there is sufficient unambiguous bandwidth to account for filter roll-off.

FIGS. 5b and 5c illustrate the second, frequency translation stage of the method of the second embodiment. The signal 500 is used to modulate a local oscillator signal 540 at frequency $f_{lo}$, thus forming spectral replicas 550 and 560 centred at sum and difference frequencies $f_{lo} \pm f_c$. FIG. 5c illustrates the final output radio frequency signal 550, which is obtained by applying a band-pass filter to the signal illustrated in FIG. 5b. The band-pass filter is centred on the centre frequency of the $f_{lo} - f_c$ spectral replica 550, has a pass band of width equal to the band width 515 of the signal generated by the interleaved digital to analogue converters, and a roll-off indicated by dashed lines 570. This signal 550 can then be passed to a suitable antenna for transmission.

FIG. 6 illustrates synthesising apparatus 600 operable to perform the method described above with reference to FIG. 5. Apparatus 600 comprises component parts 700 and 620 operable to perform the first, signal synthesis stage of the method described above with reference to FIG. 5, and component parts 630, 640, 650, 660, 670, 680 and 690 operable to perform the second, frequency translation stage of the method described above with reference to FIG. 5. Component 700, described in further detail below with reference to FIG. 7, generates a baseband signal in the frequency range 1 GHz to 3 GHz. The baseband signal is filtered by a band pass filter 620 having a pass band between 1 GHz and 3 GHz, and 40 dB attenuation at 100 MHz and at 4 GHz, and the filtered signal is then frequency translated by the second stage components in order to provide an output signal.

The filtered signal, which corresponds to that illustrated schematically in FIG. 5a, forms an input from band pass filter 620 to modulator 630, and modulates a signal received from modulator 640. The signal received from modulator 640 is the output of laser diode 650 modulated by the output of switchable local oscillator 660. Modulators 630 and 640 are both Mach-Zehnder modulators. Modulator 630 is operable to modulate an optical signal with a radio-frequency signal having a frequency in the range between 1 GHz and 3 GHz; and modulator 640 is operable to modulate an optical signal with a radio-frequency signal having a frequency in the range between 5 GHz and 19 GHz. The frequency of the output of the local oscillator 660 can be switched in 1 GHz steps over the frequency range between 5 GHz and 19 GHz, and is selected such that the frequency of the filtered signal received into modulator 630 is translated to the appropriate frequency band. For example, where it is desired that the filtered signal received by modulator 630 is translated from a centre frequency of 2 GHz to a centre frequency of 7 GHz, a local oscillator signal of frequency 9 GHz is selected. As will be recognised by those skilled in the art, the output of modulator 630 to photodiode 670 corresponds to the signal illustrated in FIG. 5b.

In the present embodiment, modulator 630 is a Mach-Zehnder optical modulator operable to modulate an optical signal with a radio frequency signal in the frequency range between 1 GHz to 3 GHz. Laser diode 650 outputs an optical signal having a wavelength of 1550 nm, with +18 dBm output power. Modulator 640 is a further Mach Zehnder optical modulator operable to modulate an optical signal with a radio frequency signal having a frequency in the range between 5 GHz to 19 GHz.

The output of modulator 630 is passed to photodiode 670, operable to output a radio frequency signal in the frequency range between 0 GHz and 20 GHz. The radio frequency signal output from photodiode 670 is filtered by a switched filter bank 680, the pass band of which is 2 GHz wide, with 40 dB rejection at frequencies 1 GHz above and below the pass band, and the centre frequency of the pass band being switchable in 1 GHz steps between frequencies in the range between 5 GHz and 19 GHz. Filter 680 is used to select the appropriate spectral replica in the signal output by the photodiode, and to reduce the intensity of any remaining component of the output of the local oscillator signal. The output from the filter 680, which corresponds to the signal illustrated schematically in FIG. 5c, is passed to antenna 690 for transmission.

FIG. 7 illustrates in more detail the component 700 of apparatus 600. Component 700 receives four signals 710 from a number digital radio frequency memory (not shown in FIG. 7). The signals are received by four digital to analogue converters 720, which convert the digital signals 710 into an analogue signal. These analogue signals are then optically interleaved. It is noted that, because of the bandwidth limitations of the individual digital to analogue converters, it is not possible simply to directly interleave a number of digital-to-analogue converters. It is instead necessary to optically interleave the digital-to-analogue converters as described below using component 700.

The outputs from digital to analogue converters 720 are used to modulated outputs from lasers 730 at Mach-Zehnder modulators 740. Lasers 730 are laser diodes emitting at a wavelength of 1550 nm. These modulated outputs are then passed to a tree of optical switches 750, 760. It will be seen that the optical switches 750, 760 form essentially the reverse of the commutator switch described above with reference to the first embodiment of the invention. Each of digital to analogue converters 720 generates a signal at 2 GS/s with 8 bit resolution, with timing controlled by a signal from clock 790. Clock 790 also provides an input to switches 750, which switch at 4 GHz between, and switch 760, which switches at 8 GHz, such that the effective sample rate of the four interleaved analogue to digital converters is 8 GS/s. A similar optical switch matrix is described in published patent application number GB2259595A. The output from switch 760 is passed to photodiode 770 for conversion back to an electrical signal. This electrical signal is then filtered by filter 620, and processed as described above with reference to FIGS. 5 and 6 in order to generate a radio frequency signal.

The above-described embodiments of the invention are operable to sample or synthesise signals in the frequency range between 4 GHz and 18 GHz. Allowing for 1 GHz filter roll-off, signals of a frequency up to 3 GHz can be unambiguously sampled or synthesised by switching out the frequency translation stage. However, in the exemplary case of the synthesising embodiment, for frequencies between 3 GHz and 4 GHz, roll-off of the band pass filter 560 used to isolate the lower spectral replica band will overlap with the baseband signal, so that the signal provided to antenna 590 will contain components both from the original baseband signal and from the desired output band. A similar problem occurs for sampling.

This problem can be avoided by using a two-stage frequency translation process, allowing the baseband frequency signal to be filtered out in an intermediate filtering stage. Thus, for example, in order to generate an output signal in a frequency band between 3 GHz and 5 GHz from a baseband signal between 1 GHz and 3 GHz, similar apparatus to that described above could be used, with the addition of a further frequency translation stage: firstly, an 8 GHz local oscillator signal is used to generate spectral replicas centred at 6 GHz and 10 GHz, and band pass filter having a 2 GHz wide pass-band, and 1 GHz roll-off, is used to select the higher-frequency spectral replica. Secondly, a 7 GHz local oscillator signal is applied, generating the desired spectral replica centred at 4 GHz, and suitable filtering applied. The skilled reader will readily appreciate that other signals at other frequencies could readily be sampled using this technique, and that a similar technique can be used to avoid similar problems occurring for signal synthesis.

In accordance with a third embodiment of the present invention, the sampling and synthesising embodiments described above are combined. By combining the sampling and synthesising embodiments, a single compact device can be fabricated. The optical commutator switches can be conveniently combined onto a single compact lithium niobate device requiring only one clock signal source to provide the clock signals to both sampling and synthesising parts of the combined apparatus, and only one laser diode to provide the optical input to both sampling. Moreover, one switchable local oscillator can be used for both sampling and synthesising components. The combined apparatus can function as an interface between an antenna for receiving and transmitting radio frequency signals, and a digital radio frequency memory for processing the radio frequency signals.

It is to be noted that the above-described embodiment is in all respects exemplary. Variations and modifications from the above described embodiments are possible without departing from the scope of the invention, which is defined in the accompanying claims. Such variations and modifications will be readily apparent to those skilled in the art. For example, it will be noted that higher rank optical commutator switches could be used, rather than using only a two rank optical commutator switch as described above. Moreover, it will be appreciated that, whilst, in the above, it has been described to use filters in the electrical domain, it will be possible to use optical Fabry-Perot filters in order to perform, for example, the function of filter 240, avoiding the need for conversion into the electrical domain. Those skilled in the art will also appreciate that it may be possible to replace some of the optical components in the above-described embodiments with analogue components, where such components of sufficiently high bandwidth are available. Finally, it will be apparent that the frequency of operation of the apparatus are not limited to the 0.5 GHz to 18 GHz band described in the above, but can be extended to cover a much wider range of frequencies by applying similar principles to those disclosed above. Optical frequency translation processes are inherently wideband when applied to radio frequency signals, and the present inventors have been able to apply such processes to frequencies of the order of 60 GHz.

Finally, it is noted that it is to be clearly understood that any feature described above in relation to any one embodiment may be used alone, or in combination with other features described, and may also be used in combination with one or more features of any other of the embodiments, or any combination of any other of the embodiments.

The invention claimed is:

1. A method of sampling a radio frequency signal comprising:
   (i) receiving the radio frequency signal;
   (ii) modulating an optical signal with the radio frequency signal to generate a modified optical signal;
   (iii) modulating the modified optical signal with an oscillator signal to generate a modulated optical signal;
   (iv) converting the optical signal to a radio frequency electrical signal;
   (v) applying a filter to the radio frequency electrical signal to select an intermediate frequency signal, the filter having an intermediate pass band and an intermediate roll-off, the intermediate pass band and the intermediate roll-off in combination defining an intermediate frequency band having a first bandwidth; and
   (vi) sampling the intermediate frequency signal at a sampling frequency using a number of analogue-to-digital converters that alternately sample the intermediate frequency signal;
   the oscillator signal and the sampling frequency in combination being arranged such that the intermediate frequency band is defined between consecutive multiples of half of the sampling frequency.

2. A method as claimed in claim 1, wherein the frequency of the oscillator signal is variable such that the intermediate frequency band can be defined between consecutive multiples of half of the sampling frequency independently of the frequency of the radio-frequency signal.

3. A method as claimed in claim 2, wherein the frequency of the oscillator signal is tuneable.

4. A method as claimed in claim 2, wherein the frequency of the oscillator signal is switchable between a number of fixed frequency oscillator signals.

5. A method as claimed in claim 1, wherein the step of receiving of the radio frequency signal comprises applying a band-definition filter to the radio frequency signal, the band-definition filter having a band-definition pass band, and a band-definition roll-off, the band-definition pass band and the band definition roll-off in combination defining a second bandwidth generally equal to the first bandwidth.

6. A method as claimed in claim 5, wherein the band-definition pass band is switchable between a number of fixed-frequency bands.

7. A method as claimed in claim 1 wherein the intermediate frequency signal is defined between zero frequency and half of the sampling frequency.

8. A method as claimed in claim 1, wherein the sampling frequency is greater than 1 giga samples per second.

9. A method as claimed in claim 1, wherein alternately sampling the intermediate frequency signal comprises:
   (i) modulating an optical signal with the intermediate frequency signal to generate an optically-carried intermediate frequency signal;
   (ii) passing the optically-carried intermediate frequency signal through an optical commutator switch, thereby generating a number of interleaved pulses; and
   (iii) detecting the interleaved pulses at a number of photodetectors, each of the photodetectors being associated with one of the analogue to digital converters.

10. A method as claimed in claim 1, wherein the sampling frequency is greater than 8 giga samples per second.

11. Sampling apparatus for sampling a radio frequency signal, the apparatus comprising:
   (i) a receiver configured to receive a radio frequency signal;
   (ii) a modulator configured to modulate an optical signal with the radio frequency signal to generate a modified optical signal, and then to modulate the modified optical signal with an oscillator signal to generate a modulated optical signal;

(iii) a converter configured to convert the modulated optical signal to a radio frequency electrical signal;

(iv) a filter operable to filter the radio frequency electrical signal to select an intermediate frequency signal, the filter having an intermediate pass band and an intermediate roll-off, the intermediate pass band and the intermediate roll-off in combination defining an intermediate frequency band having a first bandwidth; and (v) a sampler configured to sample the intermediate frequency signal at a sampling frequency;

the oscillator signal and the sampling frequency in combination being arranged such that the intermediate frequency band is defined between consecutive multiples of half of the sampling frequency.

12. Apparatus as claimed in claim 11, wherein the frequency of the oscillator signal is variable such that the intermediate frequency band can be defined between consecutive multiples of half of the sampling frequency independently of the frequency of the radio-frequency signal.

13. Apparatus as claimed in claim 12, wherein the frequency of the oscillator signal is tuneable.

14. Apparatus as claimed in claim 13, wherein the frequency of the oscillator signal is switchable between a number of fixed frequency oscillator signals.

15. Apparatus as claimed in claim 11, wherein the receiver comprises a band-definition filter for filtering the radio frequency signal, the band-definition filter having a band-definition pass band, and a band-definition roll-off, the band-definition pass band and the band definition roll-off in combination defining a second bandwidth generally equal to the first bandwidth.

16. Apparatus as claimed in claim 15, wherein the band-definition pass band is switchable between a number of fixed-frequency bands.

17. Apparatus as claimed in claim 11 wherein the intermediate frequency signal is defined between zero frequency and half of the sampling frequency.

18. Apparatus as claimed in claim 11, wherein the sampling frequency is greater than 1 giga samples per second.

19. Apparatus as claimed in claim 11, wherein the sampler comprises a number of analogue to digital converters that alternately sample the intermediate frequency signal, the sampler further comprising:

(i) a modulator to modulate an optical signal with the intermediate frequency signal to generate an optically-carried intermediate frequency signal;

(ii) an optical commutator switch operable to generate a number of interleaved pulses from the optically-carried intermediate frequency signal; and (iii) a number of photodetectors to detect the interleaved pulses, each of the photodetectors being associated with one of the number of analogue to digital converters.

20. Apparatus as claimed in claim 11, wherein the sampling frequency is greater than 8 giga samples per second.

21. A method of synthesising a radio frequency signal comprising:

(i) generating an intermediate analogue frequency signal from a digital signal by applying the digital signal to a number of digital to analogue converters, alternately accessing the outputs of the digital to analogue converters using a commutator switch to interleave the outputs of the digital to analogue converters and thereby generate a combined D/A output, and applying a band pass filter to the combined D/A output;

(ii) generating a modified optical signal by modulating an optical signal with the intermediate analogue frequency signal;

(iii) generating a modulated optical signal by modulating the modified optical signal with an oscillator signal;

(iv) converting the modulated optical signal to a radio frequency electrical signal; and (v) applying a first filter to the radio frequency electrical signal to select the radio-frequency signal, the first filter having a first pass band and a first roll-off, and the first pass band and the first roll-off in combination defining a first bandwidth, wherein an effective sample rate of the digital signal is selected such that the first bandwidth is less than, or equal to the bandwidth defined between consecutive multiples of half the effective sampling rate.

22. The method of claim 21, wherein alternately accessing the outputs of the digital to analogue converters using a commutator switch to generate a combined D/A output include:

using the outputs of the digital to analogue converters to modulate a plurality of optical signals;

using the commutator switch to alternately access and combine the modulated optical signals; and converting the combined optical signals to an electronic D/A signal, said electronic D/A signal being the combined D/A output.

23. Synthesising apparatus for synthesising a radio frequency signal, the apparatus comprising:

(i) an intermediate frequency generator configured to generate an intermediate frequency signal from a digital signal by applying the digital signal to a number of digital to analogue converters, alternately accessing the outputs of the digital to analogue converters using a commutator switch to interleave the outputs of the digital to analogue converters and thereby generate a combined D/A output, and applying a band pass filter to the combined D/A output;

(ii) a modulator configured to modulate an optical signal with the intermediate frequency signal to generate a modified optical signal, and then to modulate the modified optical signal with an oscillator signal to generate a modulated optical signal;

(iii) a converter configured to convert the modulated optical signal to a radio frequency electrical signal; and (iv) a first filter operable to select the radio-frequency signal from the radio frequency electrical signal, the first filter having a first pass band and a first roll-off, and the first pass band and the first roll-off in combination defining a first bandwidth, wherein an effective sample rate of the digital signal is selected such that the first bandwidth is less than, or equal to the bandwidth defined between consecutive multiples of half the effective sampling rate.

24. The apparatus of claim 23, wherein the intermediate frequency generator is configured to alternately access the outputs of the digital to analogue converters using a commutator switch to generate a combined D/A output by:

using the outputs of the digital to analogue converters to modulate a plurality of optical signals;

using the commutator switch to alternately access and combine the modulated optical signals; and converting the combined optical signals to an electronic D/A signal, said electronic D/A signal being the combined D/A output.

25. Apparatus comprising:
a) a sampling apparatus for sampling a first radio frequency signal, the sampling apparatus comprising:
   (i) a receiver to receive the first radio frequency signal;
   (ii) a first modulator to modulate a first optical signal with the first radio frequency signal and a first oscillator signal to generate a first modulated signal;
   (iii) a first filter operable to filter the first modulated signal to select a first intermediate frequency signal, the first filter having a first intermediate pass band and a first intermediate roll-off, the first intermediate pass band and the first intermediate roll-off in combination defining a first intermediate frequency band having a first bandwidth; and
   (iv) a sampler to sample the first intermediate frequency signal at a first sampling frequency to create a digital signal;
   the first oscillator signal and the first sampling frequency in combination being arranged such that the first intermediate frequency band is defined between consecutive multiples of half of the first sampling frequency;
b) a synthesising apparatus for synthesising a second radio frequency signal, the synthesising apparatus comprising:
   (i) an intermediate frequency generator to generate a second intermediate frequency signal from the digital signal by applying the digital signal to a number of digital to analogue converters and alternately accessing the outputs of the digital to analogue converters;
   (ij) a second modulator to modulate a second optical signal with the second intermediate frequency signal and a second oscillator signal; and
   (iii) a second filter operable to select the second radiofrequency signal from the second modulated signal.
the second filter having a second pass band and a second roll-off, and the second pass band and the second roll-off in combination defining a second bandwidth, wherein an effective sampling rate of the digital signal is selected such that the second bandwidth is less than, or equal to the bandwidth defined between consecutive multiples of half the effective sampling rate; and
c) a digital radio frequency memory;
   the sampling apparatus, synthesising apparatus and digital radio frequency memory being operable in combination to receive the first radio frequency signal, digitally process the first radio frequency signal to create the second radio frequency signal, and to transmit the second radio frequency signal.

26. A method of sampling a radio frequency signal comprising:
   (i) receiving the radio frequency signal;
   (ii) modulating a signal with the radio frequency signal to generate a modified signal;
   (iii) modulating the modified signal with an oscillator signal to generate a modulated signal;
   (iv) applying a filter to the modulated signal to generate an intermediate frequency signal, the filter having an intermediate pass band and an intermediate roll-off, the intermediate pass band and the intermediate roll-off in combination defining an intermediate frequency band having a first bandwidth; and
   (v) sampling the intermediate frequency signal at a sampling frequency; the oscillator signal and the sampling frequency in combination being arranged such that the intermediate frequency band is defined between consecutive multiples of half of the sampling frequency.

* * * * *